US012756017B2

(12) United States Patent
Hwang et al.

(10) Patent No.: US 12,756,017 B2
(45) Date of Patent: Oct. 6, 2026

(54) FOLDING METHOD FOR BATTERY POUCH AND LITHIUM SECONDARY BATTERY INCLUDING BATTERY POUCH

(71) Applicant: SK On Co., Ltd., Seoul (KR)

(72) Inventors: Ho Jin Hwang, Daejeon (KR); Young Ha Kim, Daejeon (KR); Ji Hyung Kim, Daejeon (KR); Sang Bin Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 670 days.

(21) Appl. No.: 18/140,933

(22) Filed: Apr. 28, 2023

(65) Prior Publication Data

US 2024/0234822 A1 Jul. 11, 2024

(30) Foreign Application Priority Data

Jan. 5, 2023 (KR) ........................ 10-2023-0001827

(51) Int. Cl.

| | |
|---|---|
| ***H01M 10/0583*** | (2010.01) |
| ***H01M 10/0525*** | (2010.01) |
| ***H01M 50/105*** | (2021.01) |
| ***H01M 50/184*** | (2021.01) |
| ***H01M 50/531*** | (2021.01) |

(52) U.S. Cl.

CPC ..... *H01M 10/0583* (2013.01); *H01M 50/105* (2021.01); *H01M 50/184* (2021.01); *H01M 50/531* (2021.01); *H01M 10/0525* (2013.01)

(58) Field of Classification Search

CPC ........... H01M 10/0583; H01M 50/105; H01M 50/531

See application file for complete search history.

(56) References Cited

U.S. PATENT DOCUMENTS

2005/0084749 A1* 4/2005 Hwang ................. H01M 50/55 429/185
2013/0059179 A1* 3/2013 Hosaka ............. H01M 10/0585 429/61
2013/0230767 A1* 9/2013 Pak ..................... H01M 50/171 29/623.2
2014/0147730 A1* 5/2014 Werner ............. H01M 10/0436 29/623.2
2015/0364729 A1* 12/2015 Jang .................... H01M 50/178 429/185
2016/0343999 A1* 11/2016 Yonemura .............. H01G 11/78

(Continued)

FOREIGN PATENT DOCUMENTS

KR 1020150061837 A 6/2015
KR 1020160079249 A 7/2016

(Continued)

*Primary Examiner* — Sadie White

(74) *Attorney, Agent, or Firm* — The Webb Law Firm

(57) ABSTRACT

A folding method for a battery pouch in accordance with an embodiment of the present disclosure includes the steps of folding corner areas of a pouch-type exterior member that includes a main side, a first subside on one side of the main side, and a second subside on the other side of the main side along a first folding line; folding a first portion of the pouch-type exterior member to the inside of the pouch-type exterior member along a second folding line; and folding a second portion of the pouch-type exterior member to the outside of the pouch-type exterior member along a third folding line.

9 Claims, 14 Drawing Sheets

(56) References Cited

U.S. PATENT DOCUMENTS

| | | | | |
|---|---|---|---|---|
| 2018/0219245 | A1* | 8/2018 | Choi | H01M 10/045 |
| 2021/0288365 | A1* | 9/2021 | Lee | H01M 50/536 |
| 2022/0223950 | A1 | 7/2022 | Choi et al. | |
| 2022/0278395 | A1* | 9/2022 | Ohta | H01M 50/1245 |

FOREIGN PATENT DOCUMENTS

| | | | |
|---|---|---|---|
| KR | 1020210156712 | A | 12/2021 |
| WO | 2018052214 | A1 | 3/2018 |

* cited by examiner

FOLDING METHOD FOR BATTERY POUCH AND LITHIUM SECONDARY BATTERY INCLUDING BATTERY POUCH

CROSS-REFERENCE TO RELATED APPLICATION

The present application claims priority to Korean Patent Application No. 10-2023-0001827, filed Jan. 5, 2023, the disclosure of which is hereby incorporated by reference in its entirety.

BACKGROUND OF THE INVENTION

1. Field of the Invention

The present disclosure relates to a folding method for a battery pouch and a lithium secondary battery including a battery pouch.

2. Description of Related Art

With development of electronics, communications, and space industries, the demand for lithium secondary batteries as an energy power source is rapidly increasing. In particular, as importance of global eco-friendly policies is emphasized, the electric vehicle market is growing by leaps and bounds, and research and development on lithium secondary batteries are actively carried out at home and abroad.

Lithium secondary batteries may be divided into cylindrical batteries, prismatic batteries, and pouch-type batteries depending on shapes. The pouch-type battery may be preferable to batteries having different shapes in that it may secure sufficient energy density of the battery.

On the other hand, gas may be generated inside the lithium secondary battery, and a structure for adsorbing generated gas or discharging gas may be required. Since the gas generated inside the battery may degrade a service life and stability of the battery, there is a need to eliminate the risk in regard to the generated gas.

SUMMARY OF THE INVENTION

Embodiments provide a folding method for a battery pouch which ensures enhanced cell stability owing to a controlled gas venting path, and a lithium secondary battery including a battery pouch.

In accordance with an aspect of the present disclosure, there is provided a folding method for a battery pouch, which may include folding corner areas of a pouch-type exterior member that includes a main side, a first subside on one side of the main side, and a second subside on the other side of the main side along a first folding line; and folding an area adjacent to the main side of the pouch-type exterior member along an extended folding line according to a direction from the first subside toward the second subside. The folding along the extended folding line may include folding a first portion of the pouch-type exterior member to the inside of the pouch-type exterior member along a second folding line; and folding a second portion of the pouch-type exterior member to the outside of the pouch-type exterior member along a third folding line.

In accordance with an embodiment, the pouch-type exterior member may include a first surface and a second surface that are opposite to each other. The folding along the first folding line may include bringing two or more layers of the pouch-type exterior member close to be separable from each other on the first surface of the pouch-type exterior member in the corner areas.

In accordance with an embodiment, the folding along the first folding line may include forming corner folded areas in the corner areas. The folding method for a battery pouch may further include inverting a multilayer structure formed by the two or more layers of the pouch-type exterior member in the corner folded area.

In accordance with an embodiment, the forming of the corner folded areas may include forming a space by the multilayer structure. The inverting of the multilayer structure may include orienting inner surfaces of the pouch-type exterior members that are in contact with the space outward; and orienting outer surfaces of the pouch-type exterior members that are in contact with the space inward.

In accordance with an embodiment, the inverting of the multilayer structure may include changing structures of the corner areas without changing a structure of the pouch-type exterior member in a central portion of the main side.

In accordance with an embodiment, the folding along the first folding line may include laminating an additional pouch layer onto the first surface of the pouch-type exterior member. The inverting of the multilayer structure may include moving the additional pouch layer on the first surface of the pouch-type exterior member onto the second surface of the pouch-type exterior member.

In accordance with an embodiment, in the folding method, the folding along the extended folding line may further include folding a third portion of the pouch-type exterior member to the outside of the pouch-type exterior member along a fourth folding line.

In accordance with an embodiment, the folding along the extended folding line may include forming a folding portion on the main side. The folding method for a battery pouch may further include additionally folding the folding portion along an additional folding line that is parallel to a direction in which the main side extends.

In accordance with an embodiment, the additional folding may include bending the folding portion five times.

In accordance with another aspect of the present disclosure, there is provided a lithium secondary battery which may include a pouch-type exterior member; and an electrode cell disposed in the pouch-type exterior member and including a cathode, an anode, and a separator interposed between the cathode and the anode. The pouch-type exterior member may include a body sealing portion including a folding portion, a first side sealing portion formed on one side of the body sealing portion, and a second side sealing portion formed on the other side of the body sealing portion. The folding portion may be folded in a direction inclined relative to a direction in which the pouch-type exterior member extends in corner areas of the pouch-type exterior member adjacent to the body sealing portion and bent more than twice along a folding line according to the direction in which the pouch-type exterior member extends.

In accordance with an embodiment, the lithium secondary battery may further include a cathode tab electrically connected to the cathode and disposed at a position corresponding to the first side sealing portion; and an anode tab electrically connected to the anode and disposed at a position corresponding to the second side sealing portion.

In accordance with an embodiment, the folding portion may have a structure in which the inside and the outside of the pouch-type exterior member are folded more than once respectively along a direction from the first side sealing portion toward the second side sealing portion before being folded more than twice along the direction in which pouch-type exterior member extends.

In accordance with an embodiment, a base portion of the pouch-type exterior member may include a first surface and a second surface. The folding portion may have a structure in which an additional pouch layer is disposed on the second surface of the base portion without an additional pouch layer being disposed on the first surface of the base portion before being folded more than twice along the direction in which the pouch-type exterior member extends.

In accordance with an embodiment, the folding portion may be bent five times to the inside of the pouch-type exterior member.

In accordance with an embodiment, a gas venting direction is definable in a direction parallel to a direction from the first side sealing portion toward the second side sealing portion.

According to an embodiment of the present disclosure, it is possible to provide a folding method for a battery pouch which ensures enhanced cell stability owing to a controlled gas venting path, and a lithium secondary battery including a battery pouch.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DESCRIPTION OF THE INVENTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, with reference to the accompanying drawings, a folding method for a battery pouch and a lithium secondary battery including a battery pouch in accordance with an embodiment will be described.

Figure 1:
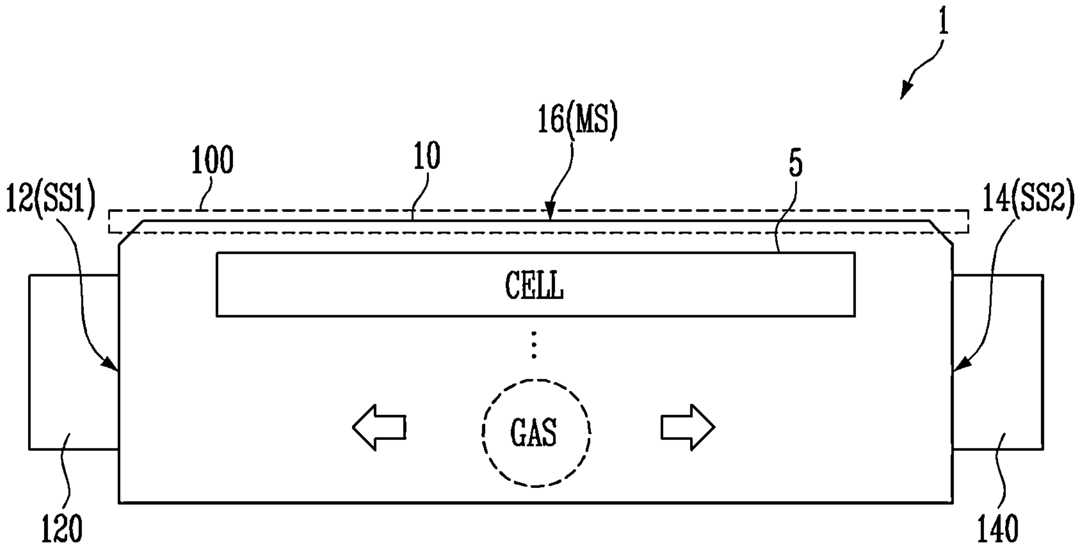
FIG. 1 is a schematic floor plan illustrating a lithium secondary battery in accordance with an embodiment.

FIG. 1 is a schematic floor plan illustrating the lithium secondary battery in accordance with an embodiment.

Referring to FIG. 1, a lithium secondary battery 1 in accordance with an embodiment is a pouch-type battery. For example, the lithium secondary battery 1 includes a pouch-type exterior member 10 and electrode cells 5 disposed in the pouch-type exterior member 10. In accordance with an embodiment, the lithium secondary battery 1 may further include a cathode tab 120 and an anode tab 140.

The pouch-type exterior member 10 may be configured to accommodate the electrode cells 5 and an electrolyte. The pouch-type exterior member 10 may include an upper sheet and a lower sheet, and the upper sheet and the lower sheet may surround the electrode cells 5.

The pouch-type exterior member 10 may have a three-sided sealing structure. For example, the pouch-type exterior member 10 includes a first side sealing portion 12, a second side sealing portion 14, and a body sealing portion 16.

The body sealing portion 16 includes a folding portion 100. The folding portion 100 may be formed on a side different from the first side sealing portion 12 and the second side sealing portion 14. For example, the first side sealing portion 12 may be formed on one side of the body sealing portion 16 (or the folding portion 100), and the second side sealing portion 14 may be formed on the other side of the body sealing portion 16 (or the folding portion 100).

The folding portion 100 may be formed by applying two or more of different folding methods. For example, the folding portion 100 may be formed by performing a first folding operation including folding a corner area on a side on which the body sealing portion 16 is formed, and a second folding operation including folding a side on which the body sealing portion 16 is formed at least twice as a whole.

With the first folding operation performed, the folding portion 100 may have a trapezoidal shape on the whole. For example, an upper surface of the folding portion 100 may be parallel to a direction in which the pouch-type exterior member 10 extends, and one side and the other side of the folding portion 100 may extend to be inclined relative to a direction in which the pouch-type exterior member 10 extends. Such the structure may be formed by folding two corner areas of the pouch-type exterior member 10 so as to form the folding portion 100. Accordingly, a structure of the corner areas at both sides of the folding portion 100 and that of a central area of the folding portion 100 may be different from each other.

A structure of the folding portion 100 that is formed by the first folding operation, the second folding operation, and each folding operation will be described in more detail with reference to drawings following FIG. 2.

On the other hand, experimentally, gas GAS generated in the electrode cells 5 may be randomly diffused, but it may be desirable that a venting direction of the gas GAS may be directed toward the first side sealing portion 12 or the second side sealing portion 14 instead of the body sealing portion 16. For example, if the gas GAS is diffused toward the body sealing portion 16, there may be a risk that a bonding structure of the pouch-type exterior member 10 is released. In addition, when the gas GAS is diffused to the outside through the body sealing portion 16, the risk of being applied to another adjacent lithium secondary battery 1 may be greater, thereby further degrading stability such as fire.

In accordance with an embodiment, the pouch-type exterior member 10 may limit a venting path of the gas GAS generated inside. For example, the body sealing portion 16 of the pouch-type exterior member 10 may include the folding portion 100 having a structure that is resistant to pressure due to diffusion of the gas GAS, and in this case, the venting path of the gas GAS may be defined to be substantially oriented toward the first side sealing portion 12 or the second side sealing portion 14.

In other words, the venting path of the gas GAS is relatively easy to control, and the risk due to diffusion of the gas GAS is limited to correspond to a relatively small area, such that it is possible to secure stability of the lithium secondary battery 1 and reduce risks due to gas GAS for the electrode cell 5. In addition, since the venting path of the gas GAS may be limited to a certain direction, a pose of the lithium secondary battery 1 may be determined to prevent the venting path of the gas GAS from facing a user of the lithium secondary battery 1, thereby securing higher stability of the lithium secondary battery 1.

The electrode cells 5 include a cathode, an anode, and a separator interposed between the cathode and the anode. The cathode and the anode may include a current collector forming a plate and an active material layer disposed on the current collector, respectively. For example, the cathode may include a cathode current collector and a cathode active material layer on the cathode current collector, and the anode may include an anode current collector and an anode active material layer on the anode current collector.

The current collector may include a conductive material known in a range that does not cause a chemical reaction in the lithium secondary battery 1. For example, the current collector may include one or more of stainless steel, nickel (Ni), aluminum (Al), titanium (Ti), copper (Cu), and a group of alloys thereof, and may be provided in various forms such as a film, sheet, or foil.

The active material layer includes an active material. For example, the cathode active material layer may include a cathode active material, and the anode active material layer may include an anode active material.

The cathode active material may be a material that lithium (Li) ions may be inserted and extracted. The cathode active material may be lithium metal oxide. For example, the cathode active material may be one of lithium manganese-based oxides, lithium nickel-based oxides, lithium cobalt-based oxides, lithium nickel manganese-based oxides, lithium nickel cobalt manganese-based oxides, lithium nickel cobalt aluminum-based oxides, lithium iron phosphate-based compounds, lithium phosphate manganese-based compounds, lithium phosphate cobalt-based compounds, or lithium phosphate vanadium-based compounds. However, the present disclosure is not necessarily limited to the examples described above.

The anode active material may be a material that lithium ions may be adsorbed and extracted. For example, the anode active material may be any one of carbon-based materials such as crystalline carbon, amorphous carbon, carbon composites, or carbon fibers, lithium alloy, silicon (Si), and tin (Sn). In accordance with an embodiment, the anode active material may be natural graphite or artificial graphite, but is not limited to a specific example.

The cathode and the anode may further include a binder and a conductive material, respectively.

The binder may be configured to mediate the bonding between the current collector and the active material layer, thereby improving mechanical stability. In accordance with an embodiment, the binder may be an organic binder or a water-based binder and used with a thickener such as carboxymethyl cellulose (CMC). In accordance with an embodiment, the organic binder may be any one of vinylidene fluoride-hexafluoropropylene copolymer (PVDF-co-HFP), polyvinylidene fluoride (PVDF), polyacrylonitrile, and polymethylmethacrylate, and the water-based binder may be styrene-butadiene rubber (SBR), but the present disclosure is not necessarily limited thereto.

The conductive material may improve the electrical conductivity of the lithium secondary battery 1. The conductive material may include a metal-based material. In accordance with an embodiment, the conductive material may include a conventional carbon-based conductive material. For example, the conductive material may include any one of graphite, carbon black, graphene, and carbon nanotubes. Preferably, the conductive material may include carbon nanotubes.

The separator may be interposed between the cathode and the anode. The separator is configured to prevent electrical short circuits between the cathode and the anode and generate flow of ions.

The separator may include a porous polymer film or a porous nonwoven fabric. Here, the porous polymer film may be formed in a single layer or multiple layers including polyolefin-based polymers such as ethylene polymers, propylene polymers, ethylene/butene copolymers, ethylene/hexene copolymers, and ethylene/methacrylate copolymers. The porous nonwoven fabric may include glass fibers with a high melting point and polyethylene terephthalate fibers. However, it is not limited thereto, and the separator may be a ceramic-containing high heat resistant separator (CCS; Ceramic Coated Separator) in accordance with an embodiment.

In accordance with an embodiment, a plurality of electrode cells 5 may be provided to be wound, laminated, or folded. Accordingly, an electrode assembly including the plurality of electrode cells 5 may be provided. In accordance with an embodiment, the electrode assembly may be provided with the electrolyte to produce the lithium secondary battery 1 in accordance with an embodiment.

The electrolyte may be a non-aqueous electrolyte. The electrolyte may include lithium salts and organic solvents. The organic solvent may include one of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran.

On the other hand, the cathode may be connected to the cathode tab 120 and electrically connected to a cathode lead made of a conductive material through the cathode tab 120. In accordance with an embodiment, the anode may be connected to the anode tab 140 and electrically connected to an anode lead made of a conductive material through the anode tab 140. The cathode lead and the anode lead that are electrically connected to the cathode tab 120 and the anode tab 140 may be configured to function as electrode interfaces configured to electrically connect the lithium secondary battery 1 and an external device to each other.

The cathode tab 120 and the anode tab 140 may be disposed on each different side. For example, the cathode tab 120 and the cathode lead may be disposed on a first subside SS1 of the electrode cells 5 (or the cathode and the anode). The cathode tab 120 may be disposed to correspond to a position of the first side sealing portion 12. The anode tab 140 and the anode lead may be disposed on a second subside SS2 of the electrode cells 5 (or the cathode and the anode). The anode tab 140 may be disposed to correspond to a position of the second side sealing portion 14.

Hereinafter, with reference to FIGS. 2 to 14, the folding method for a battery pouch and the lithium secondary battery including the battery pouch in accordance with an embodiment will be described.

FIGS. 2 to 14 are schematic step-by-step diagrams illustrating the folding method for a battery pouch in accordance with an embodiment.

FIGS. 2 to 7 and FIGS. 10 to 14 are schematic diagrams illustrating the folding method for a battery pouch in accordance with an embodiment and may be diagrams illustrating a first folding operation. FIGS. 2 to 7 are schematic floor plans illustrating the folding method for a battery pouch in accordance with an embodiment. FIGS. 10 to 14 are schematic cross-sections illustrating the folding method for a battery pouch in accordance with an embodiment. FIGS. 10 to 14 may be cross-sections illustrating a part of each of FIGS. 3 to 7.

Figure 3:
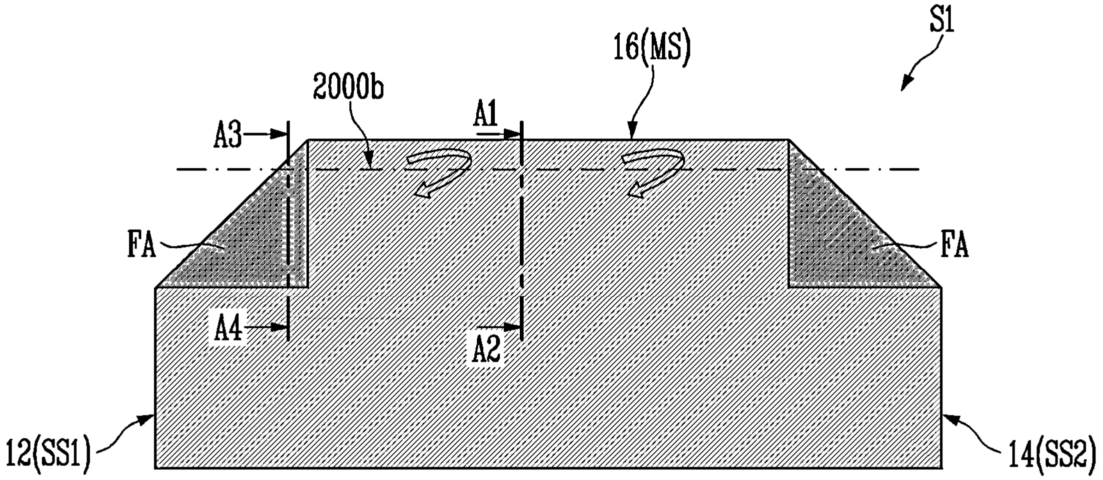
Figure 10:
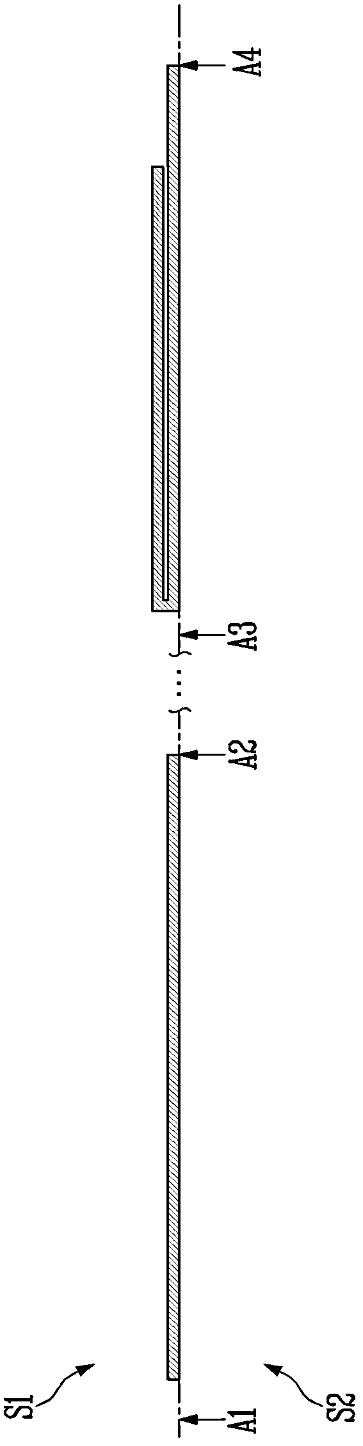
Figure 11:
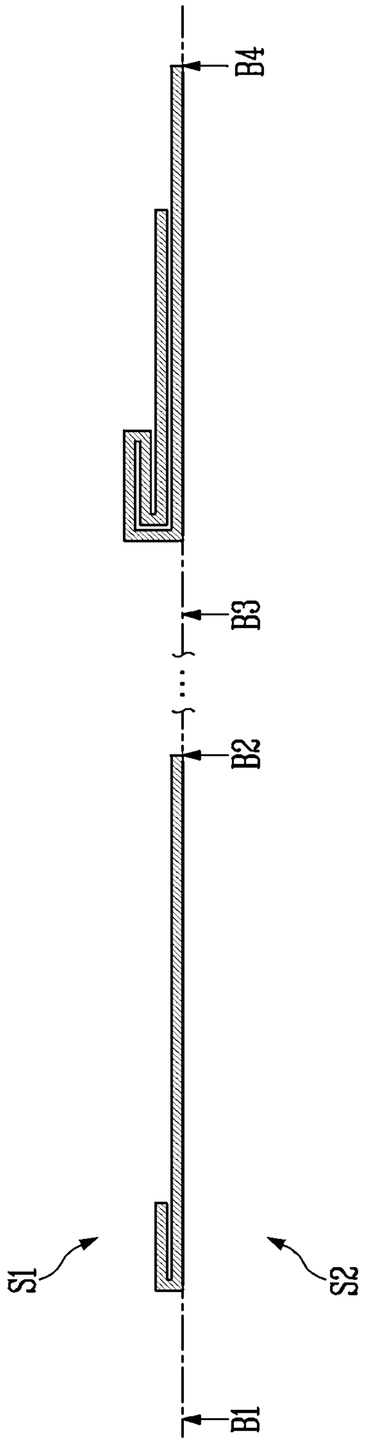
Figure 12:
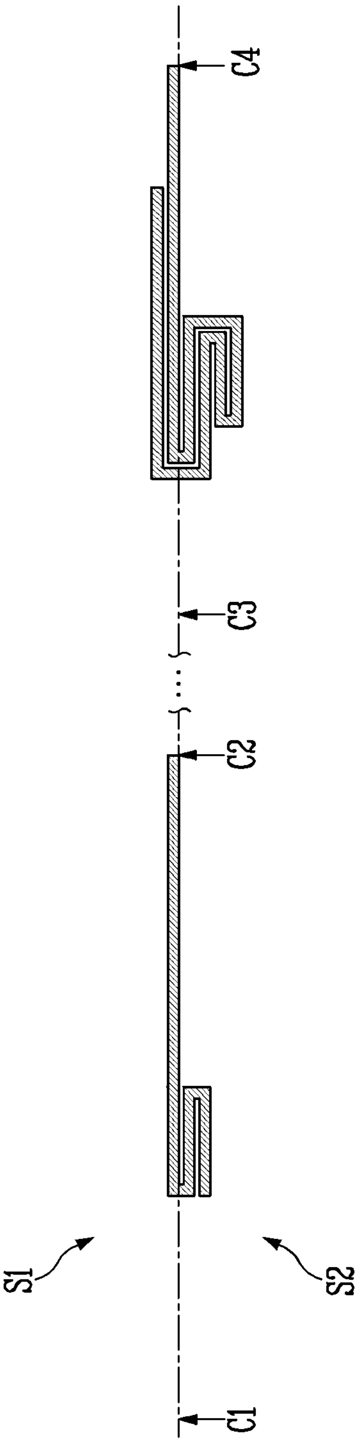
Figure 13:
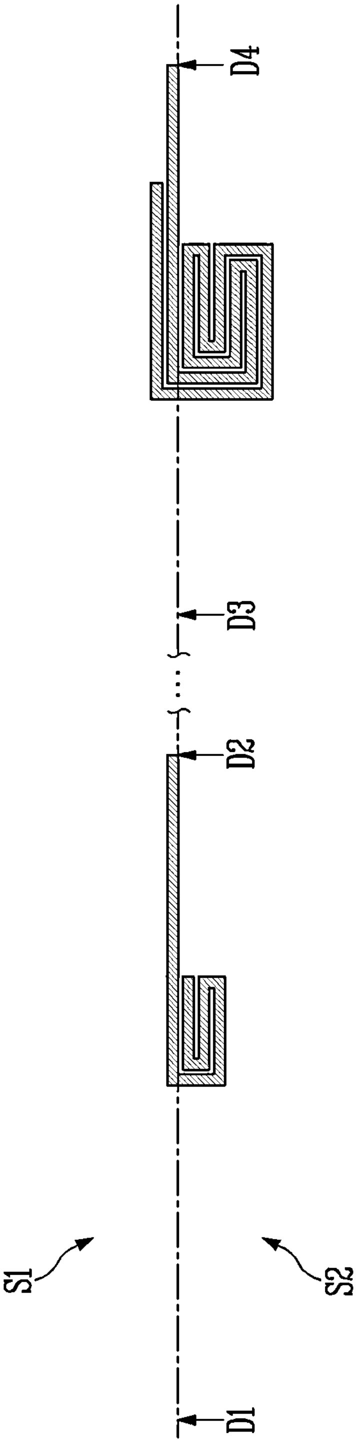
Figure 14:
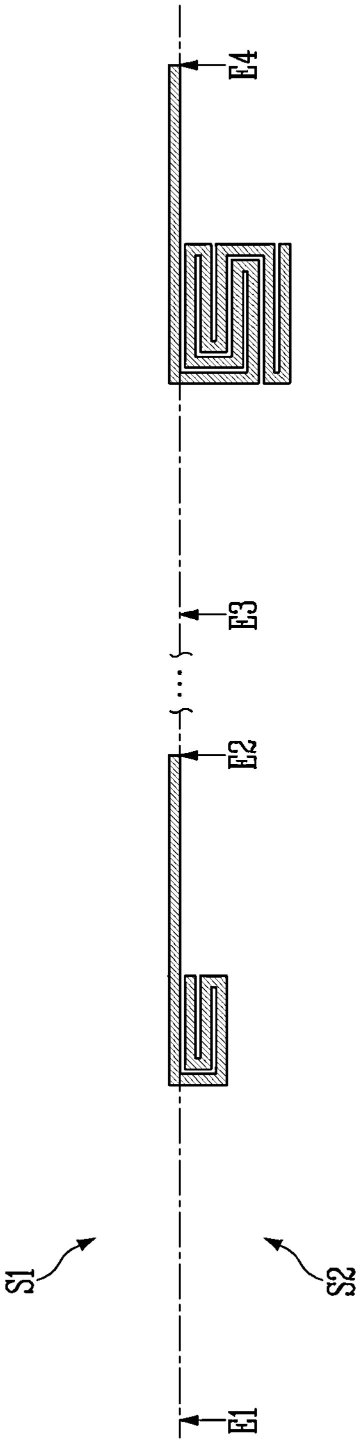

For example, FIG. 10 may be a cut cross-section in accordance with A1~A2 and A3~A4 of FIG. 3. FIG. 11 may be a cut cross-section in accordance with B1~B2 and B3~B4 of FIG. 4. FIG. 12 may be a cut cross-section in accordance with C1~C2 and C3~C4 of FIG. 5. FIG. 13 may be a cut cross-section in accordance with D1~D2 and D3~D4 of FIG. 6. FIG. 14 may be a cut cross-section in accordance with E1~E2 and E3~E4 of FIG. 7.

Figure 5:
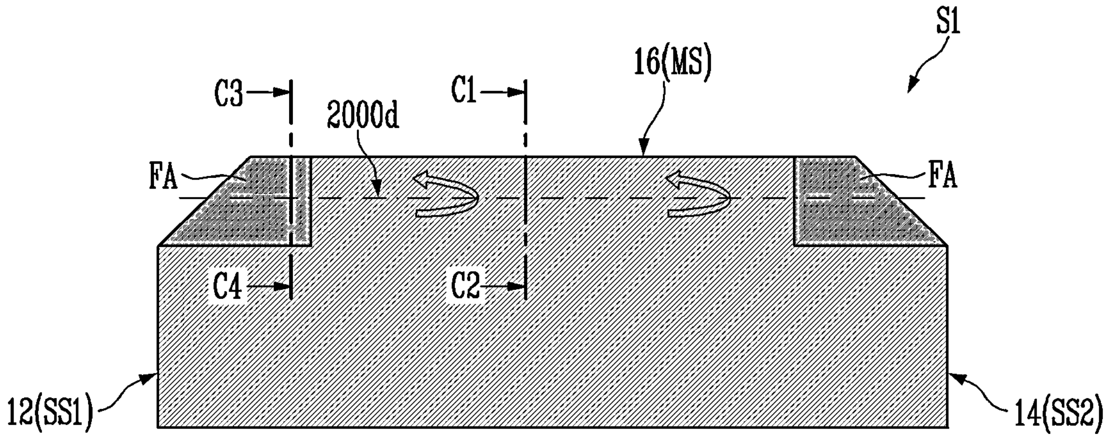
Figure 6:
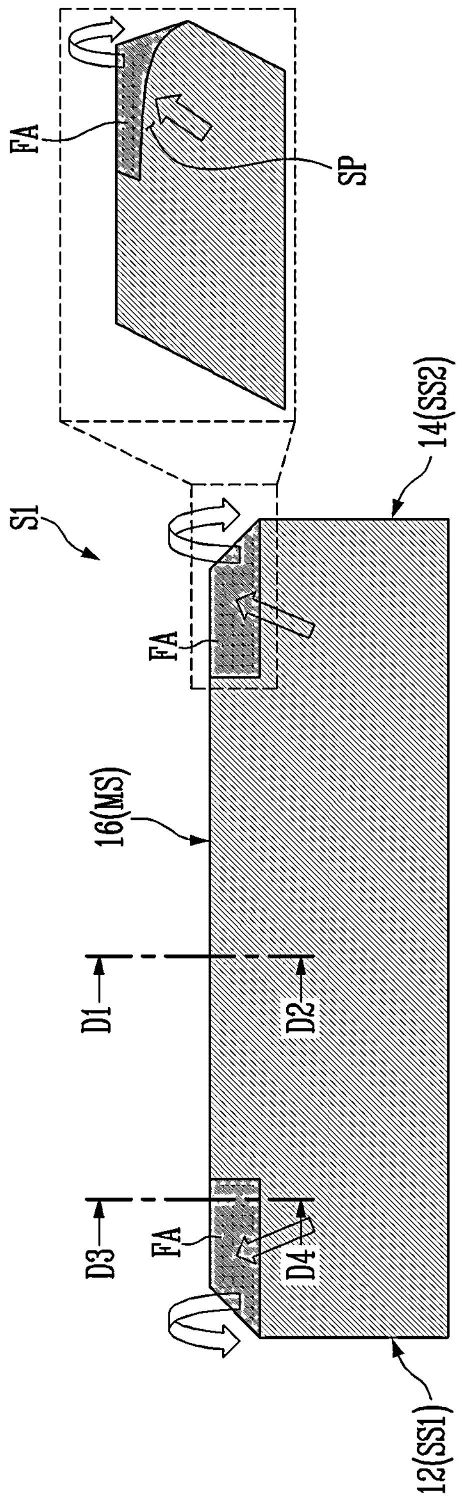
Figure 7:
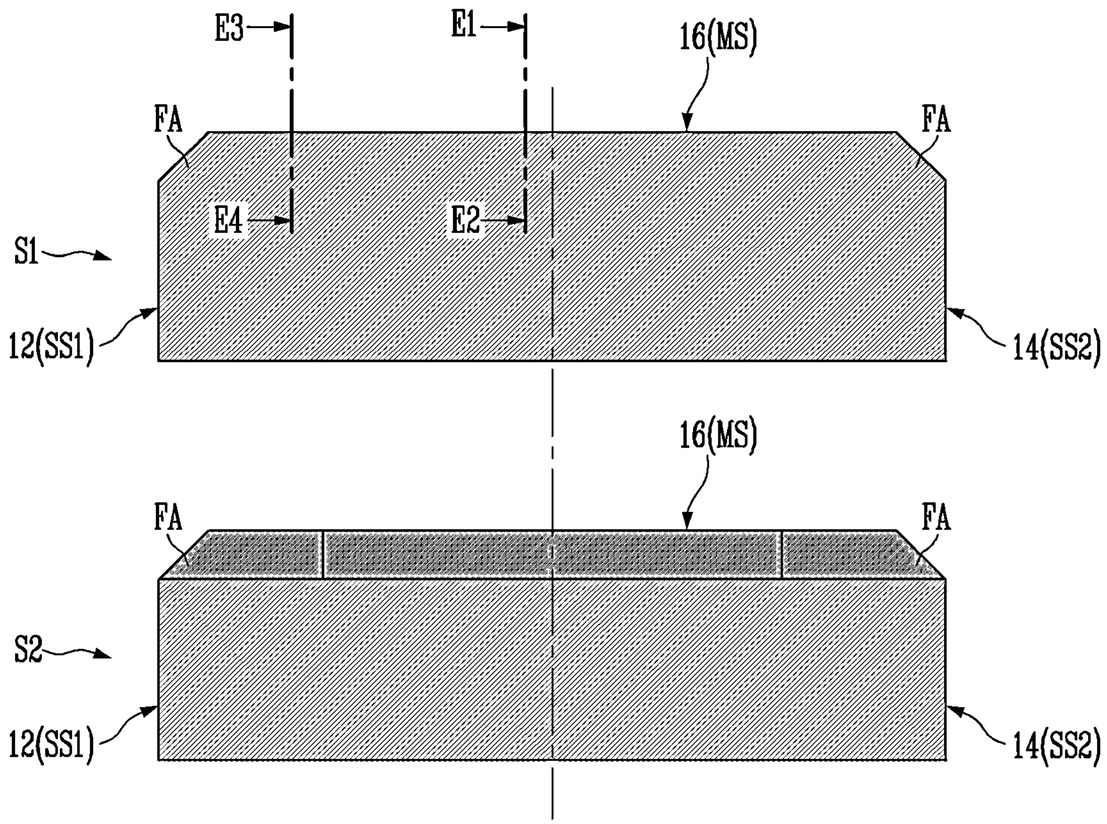

FIGS. 2 to 6 and FIG. 8 mainly show a first surface S1, which is one side of the pouch-type exterior member 10, and FIG. 7 shows the first surface S1 and a second surface S2 formed (or defined) on each opposite side of the pouch-type exterior member 10. In FIGS. 10 to 14, in order to more clearly understand a laminated structure according to the folding of the pouch-type exterior member 10, positions of the first surface S1 and the second surface S2 are designated. In accordance with an embodiment, the first surface S1 may be one surface of a base portion of the pouch-type exterior member 10, and the second surface S2 may be the other surface of the base portion of the pouch-type exterior member 10. The base portion as a part of the pouch-type exterior member 10 may be a portion including a central area that is unfolded.

Figure 8:
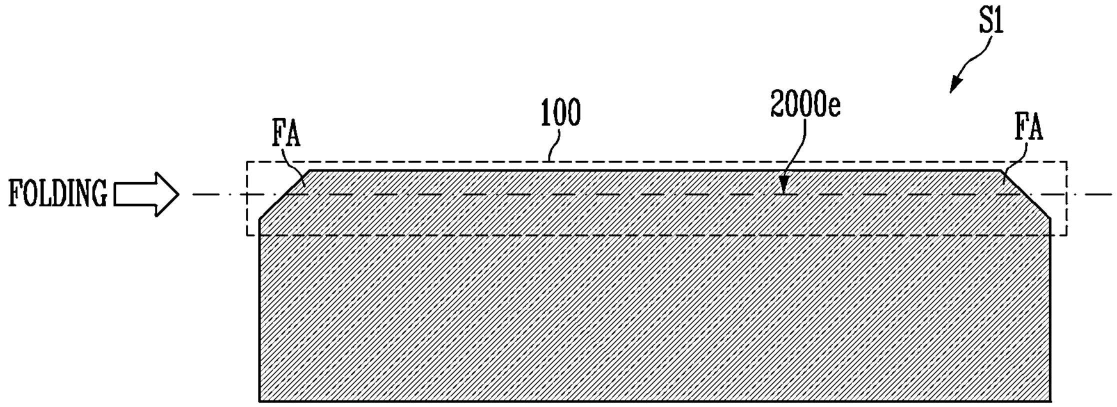
Figure 9:
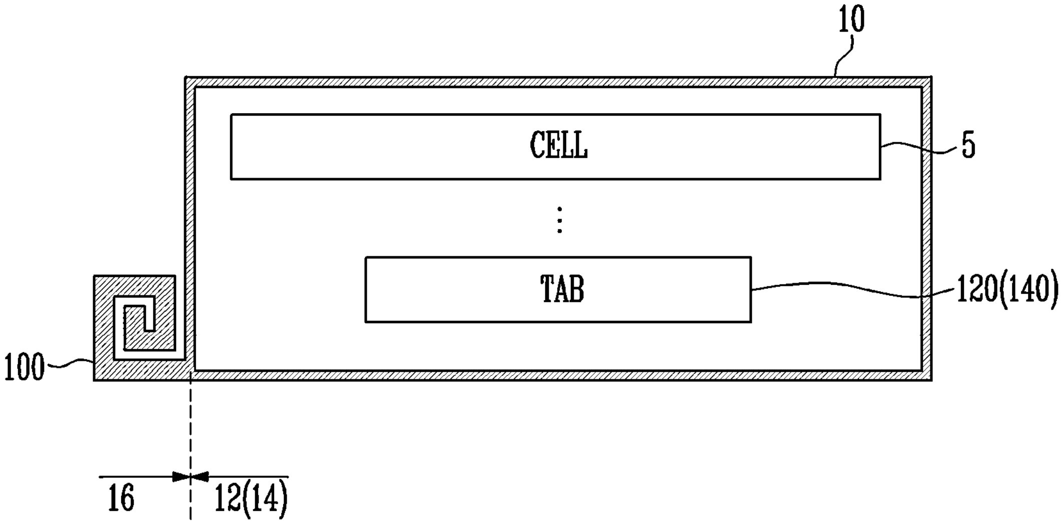

FIGS. 8 and 9 are schematic diagrams illustrating the folding method for a battery pouch in accordance with an embodiment and may be diagrams illustrating a second folding operation. FIGS. 8 and 9 may schematically illustrate a method of additionally folding the folding portion 100.

In the folding method for a battery pouch described below, a folding length and a folding angle related to the folding operation are not necessarily limited to the described examples (e.g., images shown in the drawings, etc.). For example, in order to define a gas venting path more clearly, the folding length and the folding angle related to the folding operation performed may be partially changed. Further, in accordance with an embodiment, before and/or after one or more operations of the folding operations performed, inserting of an adhesive or prosthesis onto the pouch-type exterior member 10 may be performed.

Figure 2:
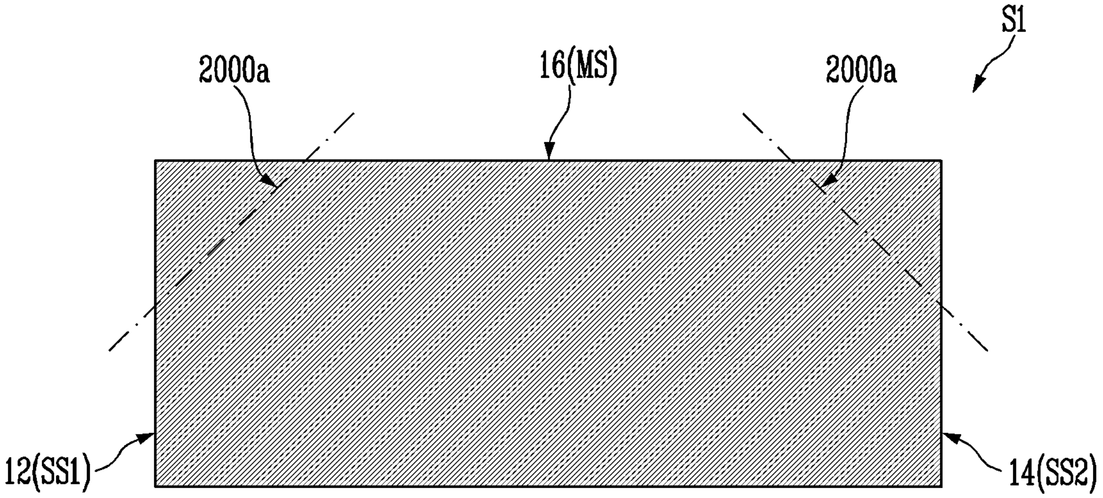
FIGS. 2 to 14 are schematic step-by-step diagrams illustrating a folding method for a battery pouch in accordance with an embodiment.

Referring to FIGS. 2, 3, and 10, as a part of the first folding operation of the folding method for a battery pouch, both corner areas of a main side MS of the pouch-type exterior member 10 may be folded along the first folding line 2000*a*. In accordance with an embodiment, before a process of folding along the first folding line 2000*a* is performed, the electrode cell 5 may be disposed in the pouch-type exterior member 10, and the cathode tab 120 and the anode tab 140 that are electrically connected to the electrode cells 5 may be formed.

The first folding line 2000*a* may be an imaginary line that connects a partial position of the first subside SS1 and a partial position of the main side MS. The first folding line 2000*a* may be an imaginary line that connects a partial position of the second subside SS2 and a partial position of the main side MS. The main side MS refers to a side on which the body sealing portion 16 described above with reference to FIG. 1 is formed. The first subside SS1 refers to a side on which the first side sealing portion 12 described above with reference to FIG. 1 is formed. The second subside SS2 refers to a side on which the second side sealing portion 14 described above with reference to FIG. 1 is formed.

As the operation is performed, the pouch-type exterior member 10 may have a trapezoidal shape having a short side parallel to the main side (MS). For example, the pouch-type exterior member 10 may have an inclined side in each of the corner areas adjacent to the main side MS.

In this operation, along the first folding line 2000*a*, as the pouch-type exterior member 10 is folded, a corner folded area FA may be formed. In the corner folded area FA, the pouch-type exterior member 10 may have a double laminated structure. Accordingly, a space SP (see FIG. 6) that is separable may be formed between the formed double laminated structures (e.g., multilayer structures).

Figure 4:
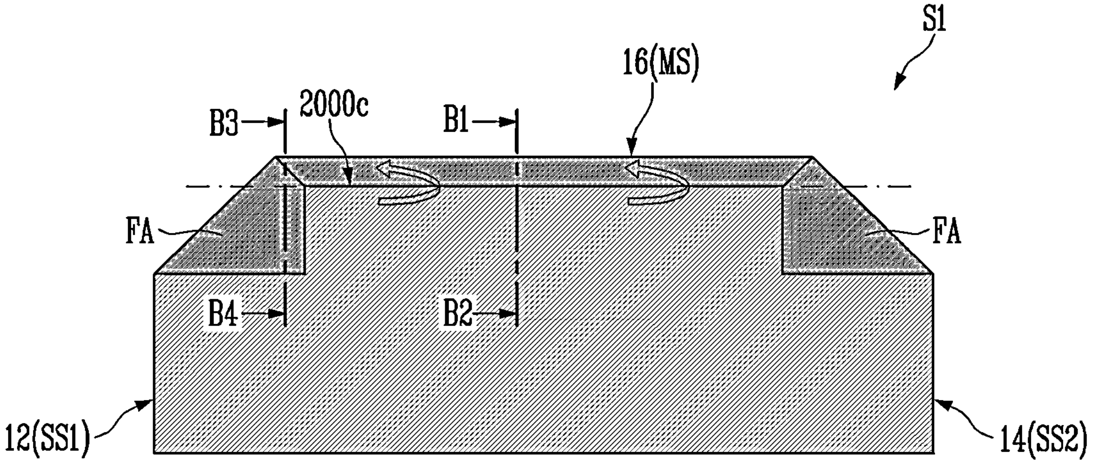

Referring to FIGS. 3, 4, and 11, as a part of the first folding operation of the folding method for a battery pouch, an area (e.g., a first portion) adjacent to the main surface MS of the pouch-type exterior member 10 may be folded along the second folding line 2000*b*.

The second folding line 2000*b* may be parallel to the short side of the trapezoidal shape that is defined by being adjacent to the main side MS of the pouch-type exterior member 10.

In this operation, a part adjacent to the main side MS of the pouch-type exterior member 10 may be folded inward. For example, the pouch-type exterior member 10 may be folded so that neighboring first surfaces S1 come in contact with respect to the second folding line 2000*b*.

In this operation, at least a part of the corner folded area FA corresponding to both sides of the trapezoidal shape may be folded along the second folding line 2000*b*. In this case, the double laminated structure in the corner folded area FA may be moved and disposed on the first surface S1.

In this case, in a central area of the main side MS, the pouch-type exterior member 10 may have a two-stage laminated structure (a cross-sectional structure of B1~B2 in FIG. 11), the pouch-type exterior member 10 may have a four-stage laminated structure on some parts of edges of the main side MS, and the pouch-type exterior member 10 may have a two-stage laminated structure (a cross-sectional structure of B1~B2 in FIG. 11) on some other parts of the edges.

Referring to FIGS. 4, 5, and 12, as a part of the first folding operation of the folding method for a battery pouch, an area (e.g., a second portion) adjacent to the main side MS of the pouch-type exterior member 10 may be folded along a third folding line 2000*c*.

The third folding line 2000*c* may be parallel to the short side of the trapezoidal shape defined by being adjacent to the main side MS of the pouch-type exterior member 10.

In this operation, a part adjacent to the main side MS of the pouch-type exterior member 10 may be folded outward. For example, the pouch-type exterior member 10 may be folded so that the neighboring second surfaces S2 come in contact with respect to the third folding line 2000*c*.

In this operation, at least a part of the corner folded area FA corresponding to both lateral sides of the trapezoidal shape may be folded along the third folding line 2000*c*. In this case, in the corner folded area FA, the four-stage laminated structure may be moved and disposed on the second surface S2.

In this case, the pouch-type exterior member 10 may have a three-stage laminated structure (a cross-sectional structure of C1~C2 in FIG. 12) in the central area of the main side MS, the pouch-type exterior member 10 may have a six-stage laminated structure in some parts of the edges of the main side MS, and the pouch-type exterior member 10 may have a four-stage laminated structure (a cross-sectional structure of C3~C4 in FIG. 12) in some other parts of the edges.

Referring to FIGS. 5, 6, and 13, as a part of the first folding operation of the folding method for a battery pouch, an area (e.g., a third portion) adjacent to the main side MS of the pouch-type exterior member 10 may be folded along a fourth folding line 2000*d*.

The fourth folding line 2000*d* may be parallel to the short side of the trapezoidal shape defined by being adjacent to the main side MS of the pouch-type exterior member 10.

In this operation, a part adjacent to the main side MS of the pouch-type exterior member 10 may be folded outward. For example, the pouch-type exterior member 10 may be folded so that the neighboring second surfaces S2 come in contact with respect to the fourth folding line 2000*d*.

In this operation, at least a part of the corner folded area FA corresponding to both latera sides of the trapezoidal shape may be folded along the fourth folding line 2000*d*. In this case, the four-stage laminated structure in the corner folded area FA may be moved and disposed on the second surface S2.

In this case, the pouch-type exterior member 10 may have a four-stage laminated structure (a cross-sectional structure of D1~D2 in FIG. 13) in the central area of the main side MS, and the pouch-type exterior member 10 may have an eight-stage laminated structure (a cross-sectional structure of D3~D4 in FIG. 13) in some parts of the edges of the main side MS.

On the other hand, the first to fourth folding lines 2000*a*, 2000*b*, 2000*c*, 2000*d* above may be extended folding lines. For example, the extended folding line may be substantially parallel to a direction extending from the first subside SS1 to the second subside SS2. The extended folding line may be substantially parallel to a direction in which the main side MS extends.

Referring to FIGS. 6, 7, and 14, as a part of the first folding operation of the folding method for a battery pouch, a part of the pouch-type exterior member 10 may be inverted in the corner folded area FA. Accordingly, the folding portion 100 that schematically has a trapezoidal shape and disposed on the main side (MS) may be formed.

For example, as described above, two or more laminated structures may be formed on the first surface S1 of the pouch-type exterior member 10 in the corner folded area FA, and a space SP may be defined. In this operation, to make inner surfaces of the pouch-type exterior member 10 in contact with the space SP oriented outward and outer surfaces of the pouch-type exterior member 10 in the corner folded area FA oriented inward, a structure of the pouch-type exterior member 10 may be inverted in the corner folded area FA.

In this case, in the central area of the main side MS, the pouch-type exterior member 10 may still have a four-stage laminated structure (a cross-sectional structure of E1~E2 in FIG. 14), and the pouch-type exterior member 10 may have an eight-stage laminated structure in some parts of the edges of the main side MS, while no additional layer may be formed on the first surface S1 of the pouch-type exterior member 10. In other words, in a process of inverting the structure of the pouch-type exterior member 10 in the corner folded area FA, a structure on the first surface S1 of the pouch-type exterior member 10 in the corner folded area FA may be moved to be disposed on the second surface S2.

Thereby, the structure of the pouch-type exterior member 10 on edges of the main side MS may be different from the structure of the pouch-type exterior member 10 at the central part of the main side MS. In this case, even if the gas GAS in the body sealing portion 16 is diffused to the central part of the main side MS subsequently, a structure at the edges may fix a bonding structure of the body sealing portion 16, and conversely, even if the gas GAS is diffused to the edge of the main side MS, a structure of the central part may fix the bonding structure of the body sealing portion 16.

In addition, the folding to the inside of the pouch-type exterior member 10 and the folding to the outside may be performed more than once, thereby making a folding structure of the pouch-type exterior member 10 strong.

In addition, when the structure of the pouch-type exterior member 10 is inverted in the corner folded area FA, a laminated structure moved from the first surface S1 to the second surface S2 during the inversion may firmly fix the remaining laminated structure.

In particular, after the pouch-type exterior member 10 is folded respectively on the inside and outside, in the process of making an inner surface of the pouch-type exterior member 10 in the corner folded areas FA oriented outward while an outer surface oriented inward, a multi-laminated structure may push a folded structure in each of the inside and the outside, and the risk of leakage of gas GAS from the body sealing portion 16 may be substantially prevented in the further.

Referring to FIGS. 8 and 9, a second folding operation of the folding method for a battery pouch may be performed. The second folding operation may be performed after the previous first folding operation is performed. For example, the folding portion 100 formed after the first folding operation is performed may be further folded along the additional folding line 2000*e*. In accordance with an embodiment, the additional folding line 2000*e* may be substantially parallel to a direction in which the main side MS extends.

In this operation, a plurality of additional folding lines 2000*e* may be defined, such that the additional folding of the folding portion 100 may be performed multiple times. For example, the folding portion 100 may be bent five times to the inside of the pouch-type exterior member 10 along different lines. The folding portion 100 may be bent by 90 degrees, 180 degrees, 270 degrees, 360 degrees, and 450 degrees and folded five times in total. In accordance with an embodiment, the folding portion 100 may be folded to the inside of the first surface S1 of the pouch-type exterior member 10. However, in this operation, the number of additional folding of the folding portion 100 may not be necessarily limited to the above-described example and variously changed to two or more times.

Accordingly, the folding portion 100 prepared according to the first folding operation and the second folding operation may be formed on a side different a position where the cathode tab 120 and the anode tab 140 are formed. As described above, the folding portion 100 limits the gas venting path, and the venting path of the gas GAS generated in the electrode cells 5 may be defined toward the first side sealing portion 12 and the second side sealing portion 14 that are formed by the cathode tab 120 and the anode tab 140.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A folding method for a battery pouch, comprising the steps of:

folding corner areas of a pouch-type exterior member that comprises a main side extending in a first direction, a first subside extending in a second direction perpendicular to the first direction on one side of the main side, and a second subside extending in the second direction on the other side of the main side along a first folding line extending in a direction intersecting both the first direction and the second direction; and folding an area adjacent to the main side of the pouch-type exterior member along an extended folding line according to a direction parallel to the first direction, wherein the folding along the extended folding line comprises: folding a first portion of the pouch-type exterior member to the inside of the pouch-type exterior member along a second folding line; and folding a second portion of the pouch-type exterior member to the outside of the pouch-type exterior member along a third folding line.

2. The folding method for a battery pouch of claim 1, wherein the pouch-type exterior member comprises a first surface and a second surface that are opposite to each other, and the folding along the first folding line comprises brining two or more layers of the pouch-type exterior member close to be separable from each other on the first surface of the pouch-type exterior member in the corner areas.

3. The folding method for a battery pouch of claim 2, wherein the folding along the first folding line comprises forming corner folded areas in the corner areas, and the folding method for a battery pouch further comprises inverting a multilayer structure formed by the two or more layers of the pouch-type exterior member in the corner folded areas.

4. The folding method for a battery pouch of claim 3, wherein the forming of the corner folded areas comprises forming a space by the multilayer structure, and the inverting of the multilayer structure comprises:

orienting inner surfaces of the pouch-type exterior member that are in contact with the space outward; and orienting outer surfaces of the pouch-type exterior member that are in contact with the space inward.

5. The folding method for a battery pouch of claim 3, wherein the inverting of the multilayer structure comprises changing structures of the corner areas without changing a structure of the pouch-type exterior member in a central portion of the main side.

6. The folding method for a battery pouch of claim 3, wherein the folding along the first folding line comprises laminating an additional pouch layer onto the first surface of the pouch-type exterior member, and the inverting of the multilayer structure comprises moving the additional pouch layer on the first surface of the pouch-type exterior member onto the second surface of the pouch-type exterior member.

7. The folding method for a battery pouch of claim 1, wherein the folding along the extended folding line further comprises folding a third portion of the pouch-type exterior member to the outside of the pouch-type exterior member along a fourth folding line.

8. The folding method for a battery pouch of claim 1, wherein the folding along the extended folding line comprises forming a folding portion on the main side, and the folding method for a battery pouch further comprises additionally folding the folding portion along an additional folding line that is parallel to a direction in which the main side extends.

9. The folding method for a battery pouch of claim 8, wherein the additional folding comprises bending the folding portion five times.

* * * * *